US009979247B2

(12) United States Patent
Luedi et al.

(10) Patent No.: US 9,979,247 B2
(45) Date of Patent: May 22, 2018

(54) SURGICAL INSTRUMENT MOTOR WITH INCREASED NUMBER OF WIRES PER PHASE SET AND INCREASED FILL FACTOR AND CORRESPONDING MANUFACTURING METHOD

(71) Applicant: Medtronic Xomed, Inc., Jacksonville, FL (US)

(72) Inventors: Manfred K. Luedi, Jacksonville, FL (US); Vikram A. Garadi, Fort Worth, TX (US); Thierry A. Bieler, Echichens (CH); Christian R. Koechli, Yvonand (CH)

(73) Assignee: Medtronic Xomed, Inc., Jacksonville, FL (US)

( * ) Notice: Subject to any disclaimer, the term of this patent is extended or adjusted under 35 U.S.C. 154(b) by 578 days.

(21) Appl. No.: 14/534,794

(22) Filed: Nov. 6, 2014

(65) Prior Publication Data

US 2016/0134165 A1 May 12, 2016

(51) Int. Cl.
| | |
|---|---|
| *H02K 3/28* | (2006.01) |
| *H02K 3/04* | (2006.01) |
| *H02K 3/47* | (2006.01) |
| *H02K 15/04* | (2006.01) |

(52) U.S. Cl.
CPC ............... *H02K 3/28* (2013.01); *H02K 3/04* (2013.01); *H02K 3/47* (2013.01); *H02K 15/0435* (2013.01); *H02K 15/0457* (2013.01); *H02K 2213/03* (2013.01)

(58) Field of Classification Search
CPC .. H02K 3/28; H02K 3/04; H02K 3/47; H02K 2213/03

USPC .................................................. 310/195–208
See application file for complete search history.

(56) References Cited

U.S. PATENT DOCUMENTS

| 5,304,884 A | 4/1994 | Kitajima et al. |
|---|---|---|
| 2005/0096683 A1 | 5/2005 | Ellins et al. |
| 2005/0116578 A1* | 6/2005 | Fleury .................. H02K 1/12 310/179 |
| 2009/0230809 A1 | 9/2009 | Hawes |
| 2010/0063524 A1 | 3/2010 | McCombs |

(Continued)

FOREIGN PATENT DOCUMENTS

KR    20110138310 A    12/2011

OTHER PUBLICATIONS

International Preliminary Report on Patentability dated May 18, 2017 for PCT/US2015/057454 filed Oct. 27, 2015.

(Continued)

*Primary Examiner* — Michael Andrews
(74) *Attorney, Agent, or Firm* — Harness Dickey

(57) ABSTRACT

A motor for a surgical instrument includes a rotor and a stator. The rotor includes a shaft and a magnet. The stator includes (i) a cavity in which the rotor is disposed, and (ii) a coil assembly. The coil assembly includes multiple phase sets. The phase sets include multiple sets of wires. Each of the phase sets includes multiple coils and corresponds to a respective one of the sets of wires. The coils in each of the phase sets are at respective positions about the rotor. One of the sets of wires includes at least three wires. The stator causes the rotor to axially rotate a surgical tool of the surgical instrument based on current received at the sets of wires.

23 Claims, 14 Drawing Sheets

(56) References Cited

U.S. PATENT DOCUMENTS

2012/0091829 A1* 4/2012 Choi .................. H01L 41/06
                                                  310/26
2012/0169154 A1* 7/2012 Curodeau ............ H02K 3/47
                                                  310/67 R

OTHER PUBLICATIONS

International Search Report and Written Opinion dated May 12, 2016 for PCT/US2015/057454 filed Oct. 27, 2015.
Jack, A., Mecrow, C. Member, IEEE, Dickinson, P., Stephenson, D., Burdess, J., Fawcett, N. and Evans, J.T., "Permanent-Magnet Machines with Powdered Iron Cores and Prepressed Windings," IEEE Transactions on Industry Applications, vol. 36, No. 4 (Jul./Aug. 2000), pp. 1077-1084.
Korean Office Action dated Nov. 14, 2017 in corresponding Korean Application No. 10-2017-7014153.
Australian Office Action dated Jan. 8, 2018 in corresponding Australian Application No. 2015343538.
Korean Office Action dated Feb. 3, 2018 in corresponding Korean Application No. 10-2017-7014153.
Canadian Office Action dated Mar. 14, 2018 in corresponding Canadian Application No. 2,966,989.

* cited by examiner

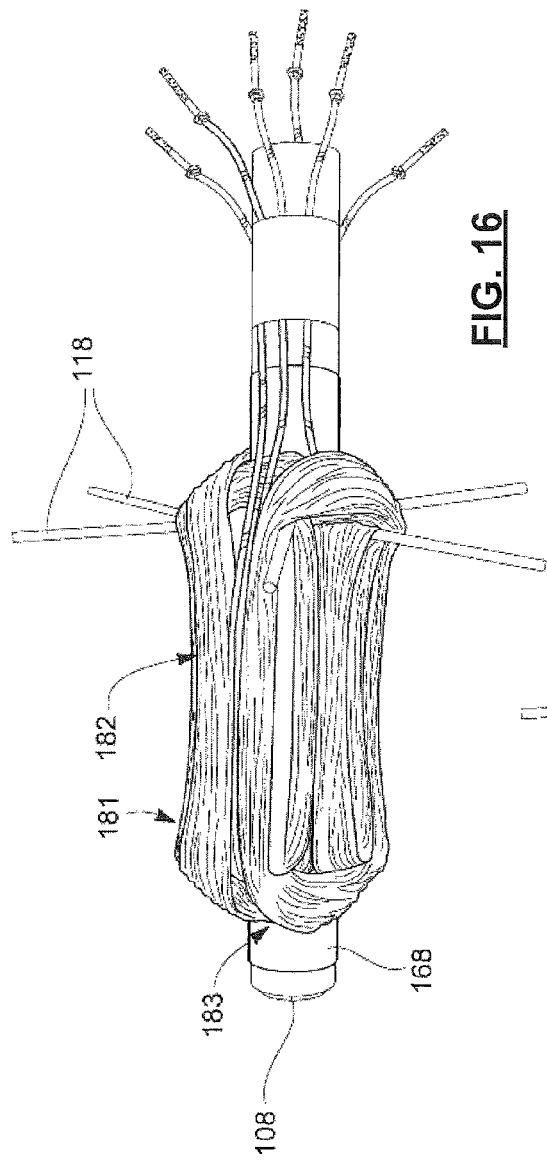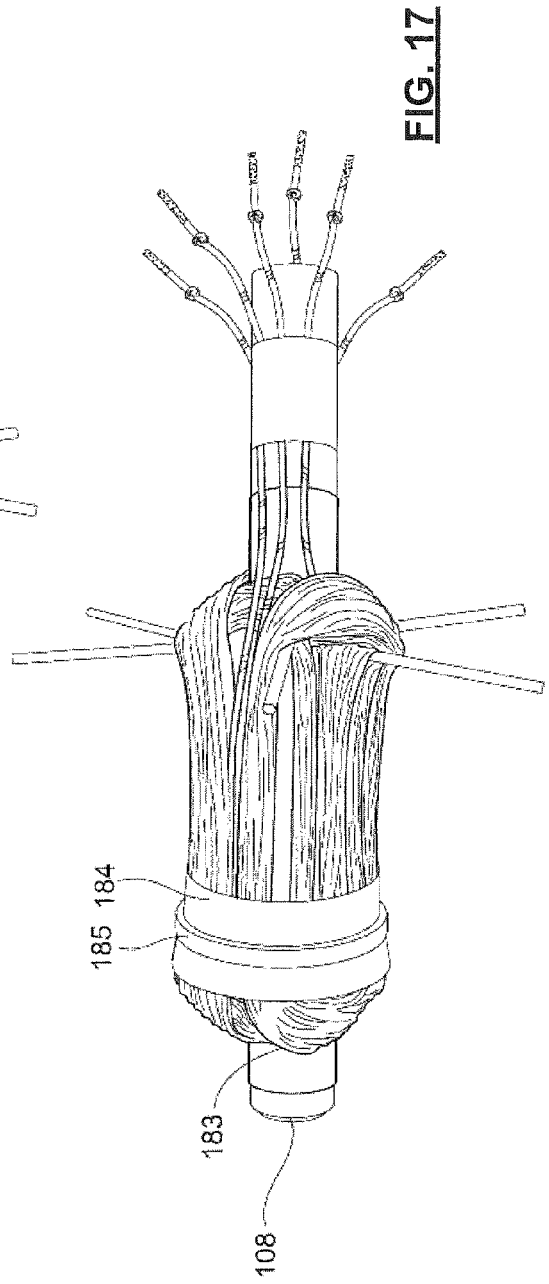

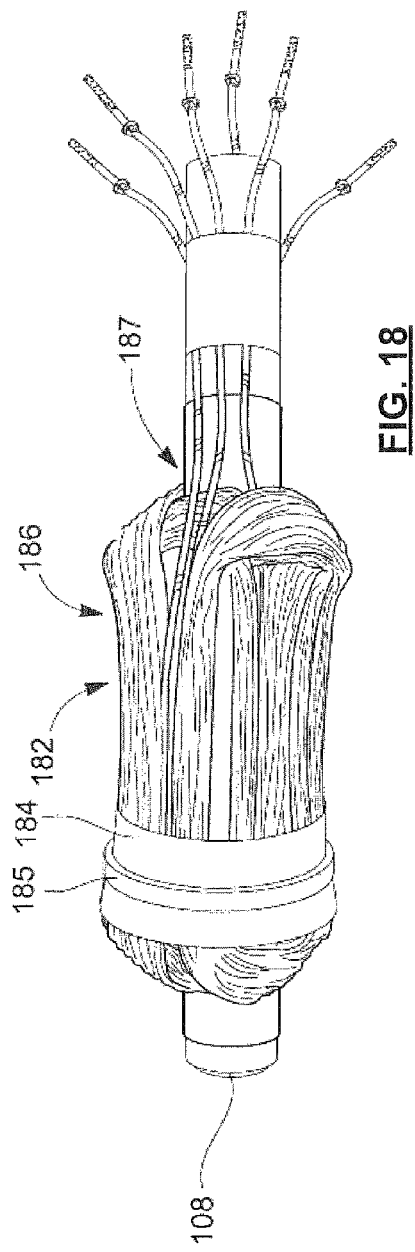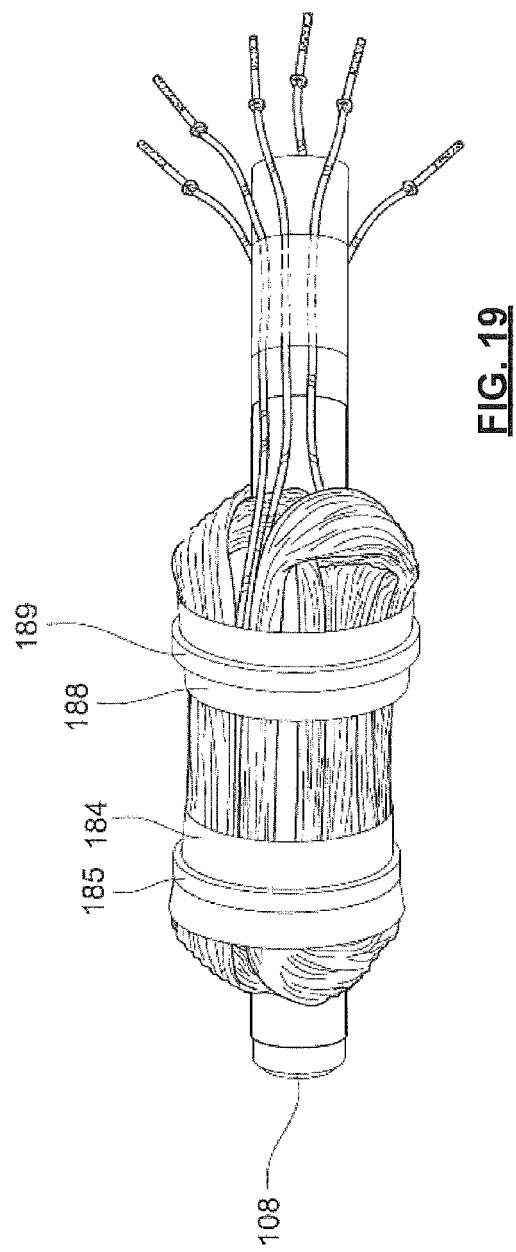

SURGICAL INSTRUMENT MOTOR WITH INCREASED NUMBER OF WIRES PER PHASE SET AND INCREASED FILL FACTOR AND CORRESPONDING MANUFACTURING METHOD

FIELD

The present disclosure relates to electric motors of hand-held surgical instruments.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A hand-held surgical instrument may have various parameter requirements including weight, power, size, current loss and heat generation requirements. Producing a hand-held surgical instrument with decreased weight, increased power output and/or torque, decreased size, reduced current loss and decreased heat generation can be difficult due to the relationships between these parameters. For example, as power output of a motor increases, heat generated by the motor generally increases. As another example, as size of a motor decreases, power output of the motor typically decreases.

A brushless direct current (DC) motor is capable of operating at higher efficiency levels and at higher speeds with reduced heat generation than a motor with brushes due to no mechanical contact between rotating and stationary components of the brushless DC motor. A brushless DC motor can include a rotor and a stator. The rotor has a shaft and a hub assembly with a centrally located magnetic structure. The stator has one or more coils. The coils are mounted on a centrally located support sleeve and proximally and distally located support rings. The rotor is held in a cavity of the stator and in a position relative to the support sleeve and support rings such that the rotor does not contact the support sleeve, the coils, and/or the support rings. Electrical current is supplied to the coils, which causes the rotor to rotate relative to the stator due to interactions between (i) magnetic fields generated by the coils and (ii) a magnetic field produced by the magnetic structure of the rotor. The rotor rotates axially in the support sleeve, the coils, and the support rings.

Brushless DC motors (hereinafter referred to as "motors") convert electrical power into mechanical power or torque. During this conversion, losses can arise that limit mechanical power, torque and speed of the motors. These losses can generally be classified into three categories: (1) load sensitive losses dependent on generated torque; (2) speed sensitive losses dependent on motor speed; and (3) pulse-width modulation (PWM) losses dependent on quality of a current supply employed to drive the motors.

The load or torque sensitive losses are generally limited to winding losses, which are proportional to a product of (i) a square of an amount of current through windings of a motor and (ii) a resistance of the windings. Speed sensitive losses (e.g., core or iron losses due to Eddy currents and hysteresis, windage and friction) act as a velocity dependent torque opposite an output torque of a motor. PWM losses are attributable to Eddy currents in a magnetic structure caused by the current supply. Eddy currents are a phenomena caused by a variation of a magnetic field through an electrically conductive medium. In the case of brushless DC motors, the coils of the stator experience a change in a magnetic field. The rotation of the rotor and current variations in the coils induce a voltage in the coils, which results in the creation of Eddy currents. Increased Eddy currents can increase thermal energy output of a motor, especially when operating at high speeds.

SUMMARY

A motor for a surgical instrument is provided and includes a rotor and a stator. The rotor includes a shaft and a magnet. The stator includes (i) a cavity in which the rotor is disposed, and (ii) a coil assembly. The coil assembly includes multiple phase sets. The phase sets include multiple sets of wires. Each of the phase sets includes multiple coils and corresponds to a respective one of the sets of wires. The coils in each of the phase sets are at respective positions about the rotor. One of the sets of wires includes at least three wires. The stator causes the rotor to axially rotate a surgical tool of the surgical instrument based on current received at the sets of wires.

In other features, a method of manufacturing a motor for a surgical instrument is provided. The method includes: providing a rod with multiple sets of pins; and wrapping multiple sets of wires on the sets of pins to form multiple phase sets on the rod to provide a coil body. Each of the phase sets includes multiple coils and corresponds to a respective one of the sets of wires. The method further includes: removing the sets of pins from the rod; compressing the coil body a first time; inserting a portion of the coil body in a sleeve; connecting the phase sets in series; applying current to the phase sets to fuse the sets of wires a first time; compressing the coil body a second time; applying current to the phase sets to fuse the sets of wires a second time; removing the coil body from the rod; and inserting the coil body into a motor housing of the surgical instrument.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 16 is a perspective view of the multi-phase set coil assembly mounted on the mandrel without a set of pins and in accordance with an embodiment of the present disclosure.

FIG. 17 is a perspective view of the multi-phase set coil assembly mounted on the mandrel having a portion of the multi-phase coil assembly wrapped and compressed in accordance with an embodiment of the present disclosure.

FIG. 18 is a perspective view of the multi-phase set coil assembly mounted on the mandrel having a second set of pins removed in accordance with an embodiment of the present disclosure.

FIG. 19 is a perspective view of the multi-phase set coil assembly mounted on the mandrel having a second portion of the multi-phase set coil assembly wrapped and compressed in accordance with an embodiment of the present disclosure.

In the drawings, reference numbers may be reused to identify similar and/or identical elements.

DESCRIPTION

Surgical instruments are disclosed below that include brushless sensorless DC motors. The brushless sensorless DC motors have increased power output and/or torque, reduced current losses including Eddy current losses, reduced coil resistances, increased fill factors (or coil slot fill levels), and reduced heat generation than motors of traditional surgical instruments. These features are provided without increasing overall exterior dimensions of the brushless sensorless DC motors. These features are provided while reducing a number of stator support components and thus simplifying an interior of a motor housing. Example methods are also disclosed for manufacturing the brushless sensorless DC motors.

Figure 1:
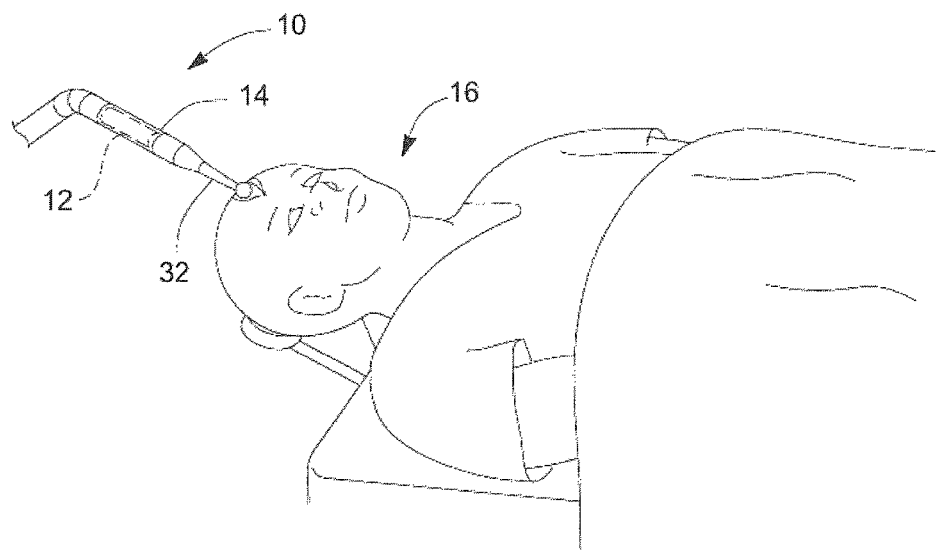
FIG. 1 is a perspective environmental view of a surgical instrument incorporating a brushless sensorless DC motor in accordance with an embodiment of the present disclosure.

FIG. 1 shows a surgical instrument 10 incorporating a brushless sensorless DC motor 12 (hereinafter referred to as "the motor"). The surgical instrument 10 includes a motor housing 14 that includes the motor 12. Examples of the motor 12 are shown in at least FIG. 4. The surgical instrument 10 may be used, for example, to mill, drill, shape and dissect bone and other tissue. The surgical instrument 10 is shown operatively associated with a patient 16. As an example, the surgical instrument 10 may be used to perform various procedures (e.g., a craniotomy). The surgical instrument 10 is not limited to any particular surgical procedures and/or applications. These applications may include dissecting bone or other tissue. Additional example applications include: 1) arthroscopy—orthopaedic applications; 2) endoscopic—gastroenterology, urology, and soft tissue applications; 3) neurosurgery—cranial, spine, and otology applications; 4) small bone—orthopaedic, oral-maxiofacial, ortho-spine, and otology applications; 5) cardio thoracic—small bone sub-segment applications; 6) large bone—total joint and trauma applications; and 7) dental applications.

Figure 2:
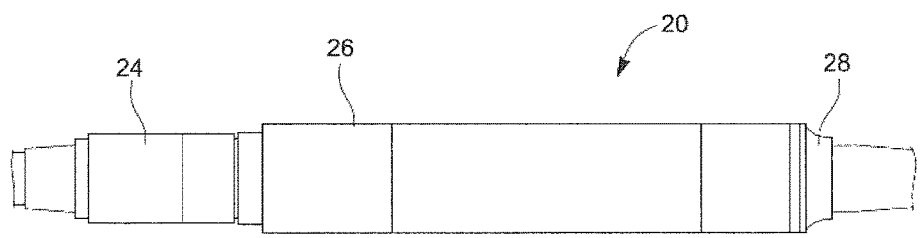
FIG. 2 is a side perspective view of a portion of the surgical instrument of FIG. 1.
Figure 3:
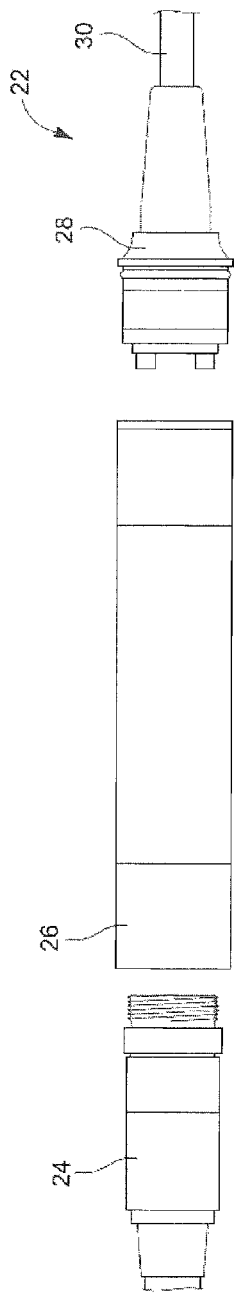
FIG. 3 is a side exploded view of a portion of the surgical instrument of FIG. 1.
Figure 4:
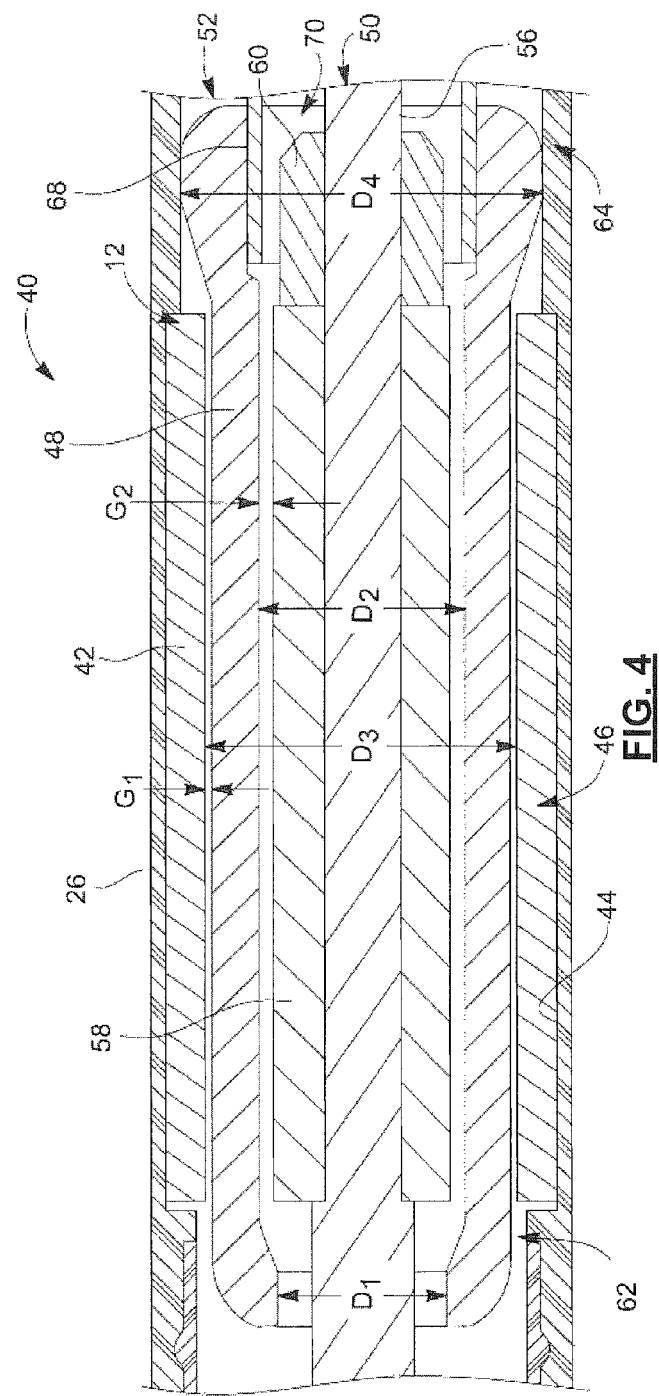
FIG. 4 is an axial cross-sectional view of a motor and a portion of a motor housing in accordance with an embodiment of the present disclosure.

FIGS. 2-3 show portions 20, 22 of the surgical instrument 10 of FIG. 1. The surgical instrument 10 includes a collet 24, the motor housing 26, a connector 28, and a cable 30. The collet 24 is configured to hold a surgical tool (e.g., surgical tool 32 is shown in FIG. 1). The surgical tool may be a cutting tool and/or dissection tool (e.g., a tool that includes a surgical bur). The motor housing 26 connects to the collet 24 and the cable connector 28. The motor 12 is mounted in the motor housing 26 and axially rotates the surgical tool based on power, current and/or voltage supplied to the motor via the cable 30. A portion of the surgical tool may extend through the collet and connect to a shaft of the motor. An example shaft is shown in FIG. 4. In operation, the motor 12 provides torque to axially rotate (or spin) the surgical tool.

FIG. 4 shows an axial cross-sectional view of (i) a portion 40 of the motor housing 26 of FIGS. 2-3, and (ii) the motor 12. The motor housing 26 includes laminations 42. The laminations 42 are cylindrically-shaped and are mounted on interior walls 44 of the motor housing 26 adjacent and opposing one or more magnets 58 (or a center portion 46 of the motor 12). The laminations 42 channel, direct or steer a magnetic field generated by the one or more magnets 58 and electrical currents in a coil body 48 away from the housing 26. This directs magnetic flux provided by the magnetic field of the one or more magnets 58 through the coil body 48 of the motor 12, as opposed to the magnetic flux being received by the motor housing 26. The motor 12 includes a rotor 50 and a stator 52.

The rotor 50 includes a shaft 56 on which the one or more magnets 58 are mounted. The shaft 56 may be connected to a surgical tool (e.g., the surgical tool 32 of FIG. 1). The surgical tool may be axially rotated based on axial rotation of the shaft 56. The shaft 56 and the magnets 58 are axially rotated within the stator 52. The one or more magnets 58 may include, for example, high-energy density rare-earth magnetic materials. A press ring 60 may be mounted on the shaft 56 and incorporated to balance spinning motion of the shaft 56. The shaft may ride on bearing sets (not shown) proximally and distally located in the motor housing 26.

The stator 52 may include the coil body 48 (sometimes referred to as a multi-phase set coil assembly) with a predetermined number of coils (e.g., six coils or two coils per phase set). Examples of the coils are shown in FIGS. 5-6, 13-14, and 16-23. Although the motors disclosed herein are primarily described with respect to a 3-phase set coil assembly having 6 coils, the motors may have any number of phase sets and/or coils per phase set. A 3-phase set refers to coils of each phase set being at respective axial phases (or axial positions) around the rotor 50. Each of the phase sets may be at 120° intervals around the rotor 50. As shown in FIG. 4, the stator 52 includes the coil body 48 and does not include proximal, central and/or distally located support members. This is due to the rigid structure of the coil body 48, which is further described below. The coil body 48 is held in place within the laminations 42 and the interior walls 44. This is unlike traditional coil bodies that have proximal, central and distal support members (e.g., support rings extending within the coil bodies).

The coil body 48 has a distal end 62 and a proximal end 64. Although not shown in FIG. 4, sets of wires extend from the proximal end 64 and receive power from a power source via a cable (e.g., the cable 30 of FIG. 3). The sets of wires are shown in FIGS. 14, 16-22 and 24. The proximal end 64 may be held between the motor housing 26. The coil body 48 and thus the coils of the coil body 48 are sized to fill a high-percentage of a cavity 70 of the coil body 48 between the laminations 42 and the magnets 58 while not contacting the laminations 42 and the magnets 58. A first gap G1 exists between the laminations 42 and the coil body 48 and may be filled with a dielectric material for electric isolation. A second gap G2 (or air gap) exists between the coil body 48 and the magnets 58. A first inner diameter D1 of the coil body 48 at the distal end 62 may be, for example, 6-6.5 millimeters (mm). A second inner diameter D2 of the coil body 48 in the center portion 46 and opposing the magnets 58 may be, for example, 7-8.2 millimeters (mm). A first outer diameter D3 of the coil body 48 in the center portion 46 may be, for example, 10-11 mm. A second outer diameter D4 of the coil body 48 at the proximal end 64 may be, for example, 12-14 mm.

Figure 6:
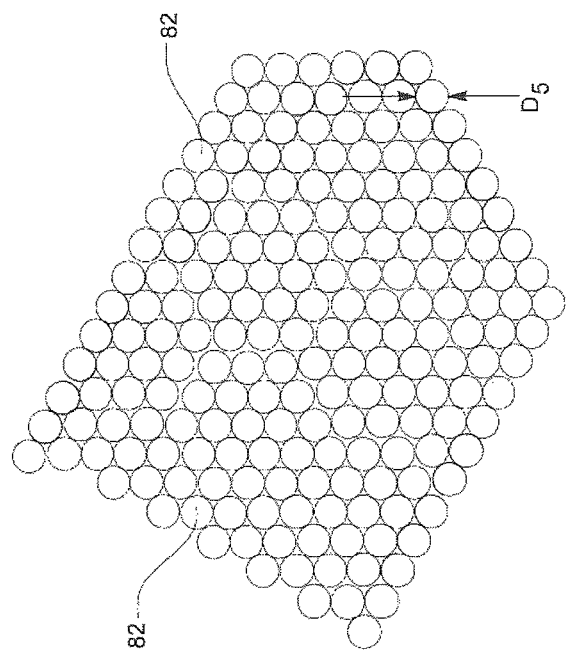
FIG. 6 is a sectional view of compressed and fused wires of coils of a motor in accordance with an embodiment of the present disclosure.
Figure 5:
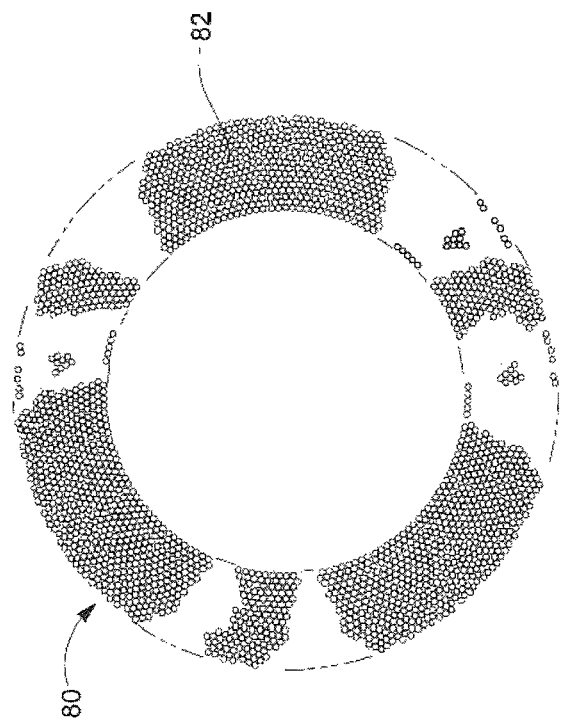
FIG. 5 is a radial cross-sectional view of a multi-phase set coil assembly of a motor in accordance with an embodiment of the present disclosure.
Figure 25:
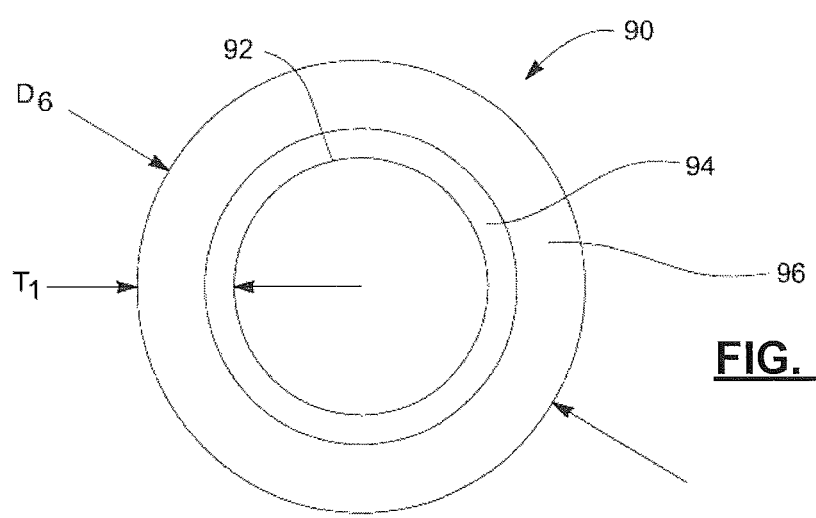
FIG. 25 is a cross-sectional view of a wire in accordance with an embodiment of the present disclosure.

FIGS. 5-6 show radial cross-sectional views of a coil body (or multi-phase set coil assembly) 80 of a motor (e.g., the motor 12 of FIG. 1). The coil body includes multiple coils and may replace the coil body 48 of FIG. 4. Each coil of the coil body includes sets of wires. Some of the wires are designated 82. Each of the wires includes a conductive filament and a thin outer insulation layer to prevent electrical connections between the wires. The number of wires in each of the sets of wires and cross-sectional diameters (an example cross-sectional diameter D5 is shown in FIG. 6) of the wires affects a fill factor of the coil body. The fill factor refers to a percentage of conductive material (e.g., copper) contained within a volume (or envelope) of the coil body. An example cross-sectional view of a wire 90 including a filament 92, an insulation layer 94 and a bonding layer 96 is shown in FIG. 25.

The higher the fill factor, the more conductive material within a given area. Also, the higher the fill factor or the more conductive material per set of wires, the lower the resistances of the sets of wires. In general, the more conductive material, the more power output and/or torque produced by a corresponding motor. Also, as the number of wires per set increases, for a given fill factor, the amount of Eddy current losses decreases. On the other hand, as the fill factor increases, the amount of Eddy current losses increases. In addition, there are structural and manufacturing limits as to how small a cross-sectional diameter of the wires can be and how many wires can be manufactured, handled, and wrapped, to form the coils. For example, the smaller the cross-sectional diameter of the wires, the more likely that the wires are deformed during manufacturing. The smaller the cross-sectional diameter of each of the wires, the more wires can be wrapped to fill a given volume. Although the more wires the lower the fill factor. This is due to the volume associated with the insulation layers of the wires.

Thus, to maximize power and torque output of a motor, minimize size of the motor, minimize current losses, prevent deforming of wires of the motor, and assure the motor is an efficient and structurally reliable motor, certain parameters of a coil body are selected to be within predetermined ranges. In addition, the coil body is constructed to minimize number of coil supports and to maximize a fill factor for a given volume of the coil body. As a first example, each set of wires may include a predetermined number of wires (e.g., 10-20 wires). In one embodiment, each of the sets of wires includes 15-18 wires. In another embodiment, each of the sets of wires includes 17-18 wires. As another example, the cross-sectional diameter of the wires may be 0.09-0.14 mm. As yet another example, a combined thickness of an insulation layer and a bonding (or adhesive) layer of each of the wires may be, for example, 10-20 micrometers (μm). Each of the wires has an insulation layer and may have a bonding (or adhesive layer). The purpose of these layers is further described below. An example cross-sectional diameter D6 of the wire 90 and a corresponding combination thickness T1 of the insulation layer 94 and the bonding layer 96 are shown in FIG. 25.

In one embodiment, the wires are 38 American wire gauge (AWG38) wires, where a combination thickness of an insulation layer and a corresponding bonding layer of each of the wires is 15 μm. As still another example, the fill factor may be (i) 58-65% if bonding layers or a bonding agent is used, or (ii) 66-74% if bonding layers or a bonding agent is used. A bonding agent or varnish may be applied to the insulation layers to provide the bonding layers.

Incorporating sets of wires, where each of the sets of wires has a number of wires within a predetermined range (e.g., 15-18) and the cross-sectional diameters of the wires are within a second predetermined range (e.g., 0.10-0.12 mm), provides a fill factor with an increased level of conductive material, reduced phase set resistances, reduced current losses, and as a result reduced heat generated. This is especially true during high-load and/or high-speed operating conditions. Under low-load and/or low-speed operating conditions, Eddy current losses are minimized by providing a motor with numbers of wires, in each of the sets of wires, being in one of the predetermined ranges. Eddy current losses increase as fill factor increases.

The sets of wires are compressed and fused to each other, as further described below with respect to the method of FIG. 7, to increase a fill factor of the coils. A bonding agent may be applied to the wires prior to and/or during wrapping, compressing and/or fusing tasks associated with manufacturing of the coil body. The bonding agent may be used to aid in fusing the wires together to provide a rigid structure that has minimal flex during high-speed spinning. In one embodiment, a bonding agent is not used. The compression and fusing of the wires allows for the coil body not to be supported centrally and/or at proximal and/or distal ends by support members. Removal of proximal, distal and centrally located support members allows for additional conductive material to be incorporated in a same size volume. This allows for additional wrappings of the wires and/or an increased number of wires per set of wires to be used in the coils of the coil body.

Figure 7:
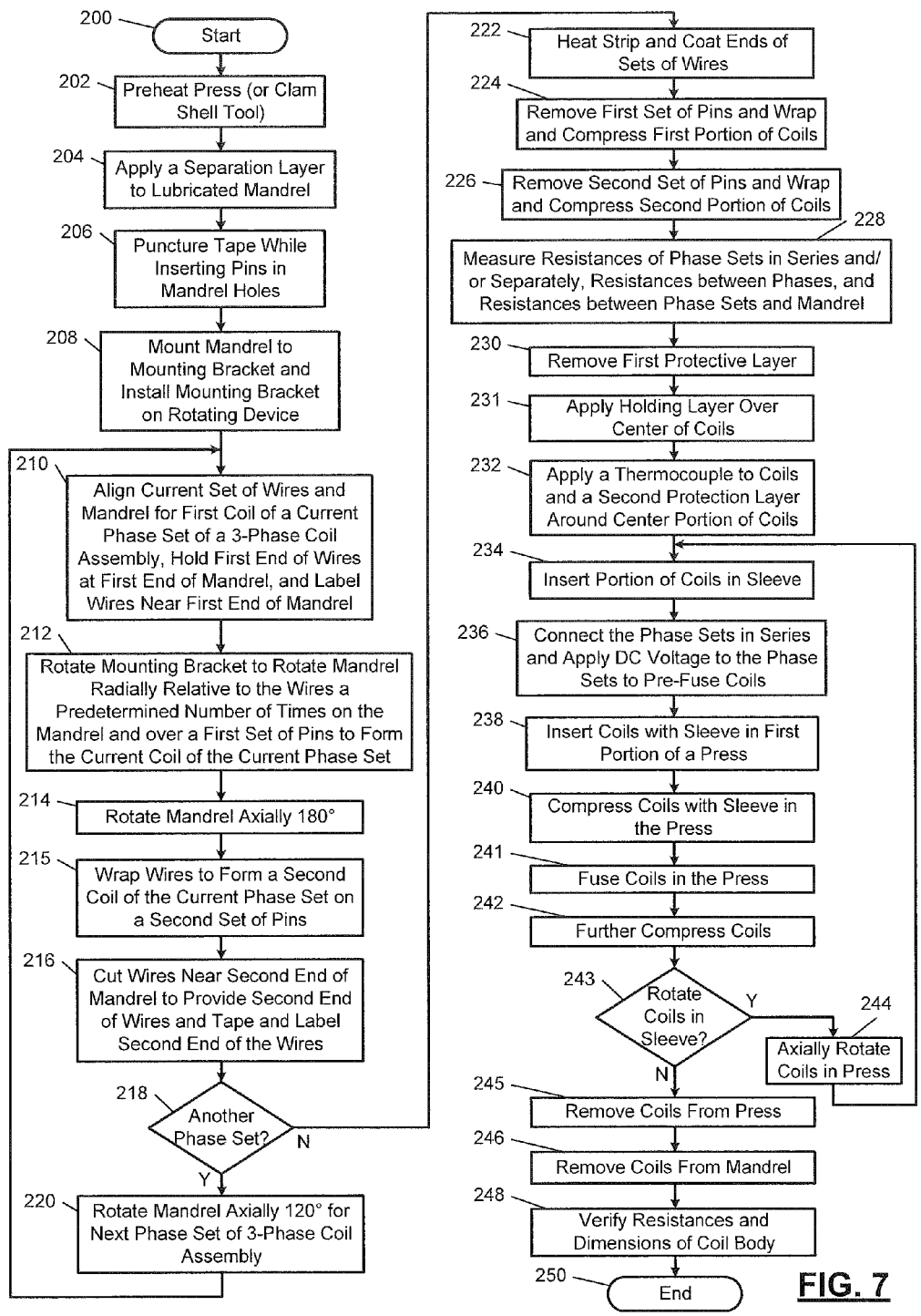
FIG. 7 illustrates a method of constructing a multi-phase set coil assembly of a motor in accordance with an embodiment of the present disclosure.

The coil bodies (or coil assemblies) disclosed herein may be manufactured using the method of FIG. 7. FIG. 7 shows a method of constructing a multi-phase set coil assembly of a motor. Although the following tasks are primarily described with respect to the implementations of FIGS. 1-6, the tasks may be easily modified to apply to other implementations of the present disclosure. The tasks may be iteratively performed.

The method may begin at 200. At 202, a press 100 (shown in FIG. 24) is pre-heated to a predetermined temperature for a predetermined period. The press 100 may be in a form of a clam shell having a base 102 (or clam shell bottom) and a compression block 104 (or clam shell top). The predetermined temperature may be, for example 200° C. The predetermined period may be, for example, 2 hours.

Figure 8:
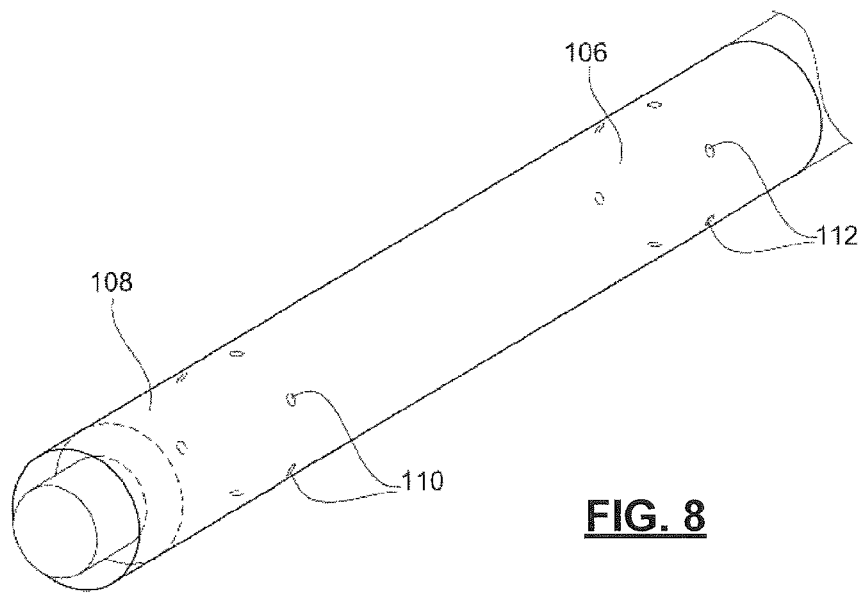
FIG. 8 is a side perspective view of a mandrel having a separation layer in accordance with an embodiment of the present disclosure.

At 204, a separation layer 106 may be applied to a lubricated mandrel 108 (or other lubricated cylindrical rod), as shown in FIG. 8. In one embodiment, step 204 is skipped and the separation layer 106 is not applied to the mandrel 108. The mandrel 108 may be cylindrically shaped and include two sets of holes 110, 112. Each of the sets of holes includes a predetermined number of holes (e.g. 6 holes per set). The holes 110, 112 in each of the sets of holes 110, 112 are evenly distributed around the mandrel 108 at 60° increments (or intervals). Each set of holes may be perpendicular to a central longitudinal axis of the mandrel 108 or at other angles (e.g. 30-60° degrees) relative to the central longitudinal axis such that the holes angle outward toward proximal and/or distal ends of the mandrel 108. The separation layer 106 may be applied to the mandrel 108 with an adhesive side of the separation layer 106 facing outward away from the mandrel 108 and a non-adhesive side of the separation layer 106 facing the mandrel 108. As an example, the separation layer 106 may include a polyimide film layer and an adhesive layer. The adhesive layer providing the adhesive side of the separation layer 106.

Figure 9:
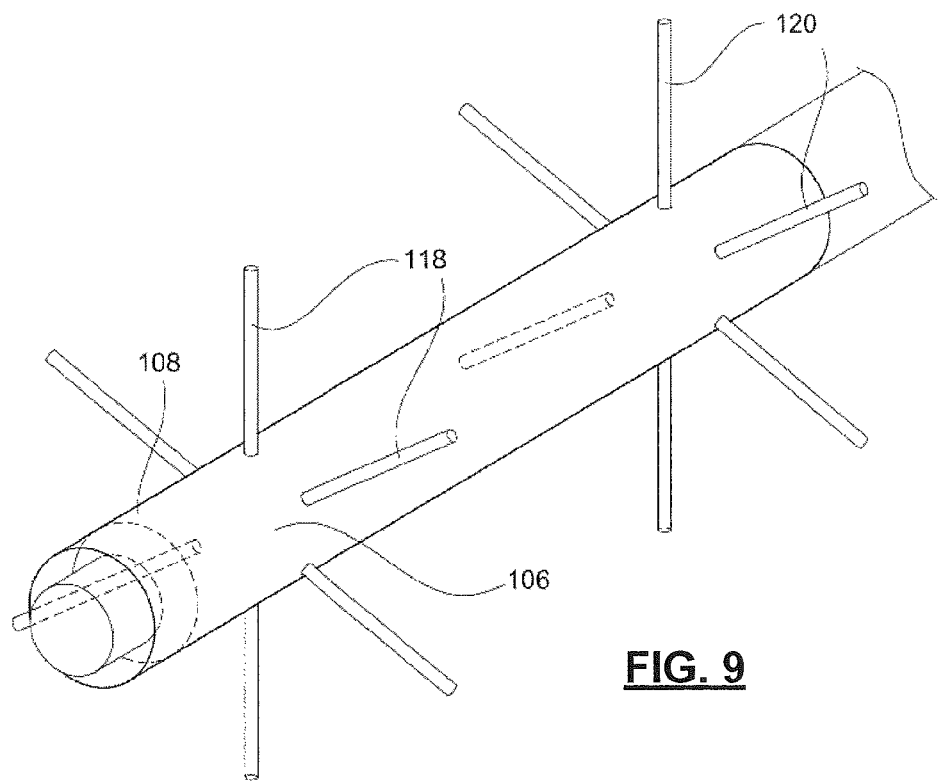
FIG. 9 is a perspective view of a portion of the mandrel illustrating sets of pins inserted in the mandrel in accordance with an embodiment of the present disclosure.

At 206, two sets of pins 118, 120 are inserted in the holes 110, 112 in the mandrel 108. This includes puncturing holes in the separation layer 106 at the holes 110, 112 in the mandrel 108. FIG. 9 shows the pins 118, 120 in the holes 110, 112. The pins 118, 120 while in the holes 110, 112 extend radially outward and provide wrapping points for sets of wires, as further described below.

Figure 10:
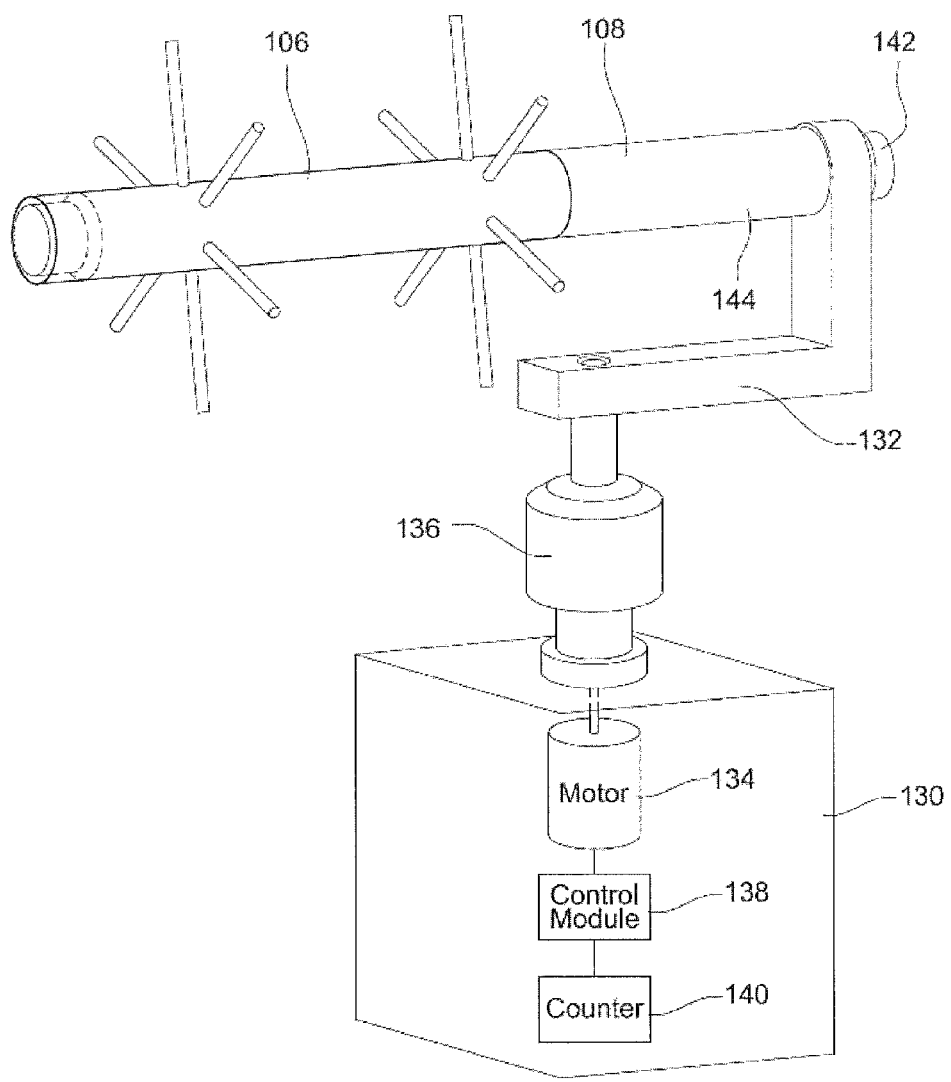
FIG. 10 is a side perspective view of the mandrel mounted on a rotating device in accordance with an embodiment of the present disclosure.

At 208, the mandrel 108, with the separation layer 106 and the pins 118, 120, is mounted on a rotating device 130 via a mounting bracket 132. As an example, the rotating device 130 may include a motor 134, a rotary chuck 136, a control module 138 and a counter 140, as shown in FIG. 10. The mandrel 108 is held by the mounting bracket 132, which is rotated via the rotary chuck 136. The mandrel 108 may be connected to the mounting bracket 132 via a screw 142 that extends through a portion of the mounting bracket 132 and into a first end 144 of the mandrel 108. The motor 134 may spin the rotary chuck 136. This may be controlled by the control module 138 and based on a count indicated by the counter 140. The control module 138 may radially rotate the mandrel 108 a predetermined number of times when forming each coil of a coil assembly. The control module 138 may stop rotating the mandrel 108 when the counter 140 reaches the predetermined number of times. This rotation is performed as described below at 212.

Figure 11:
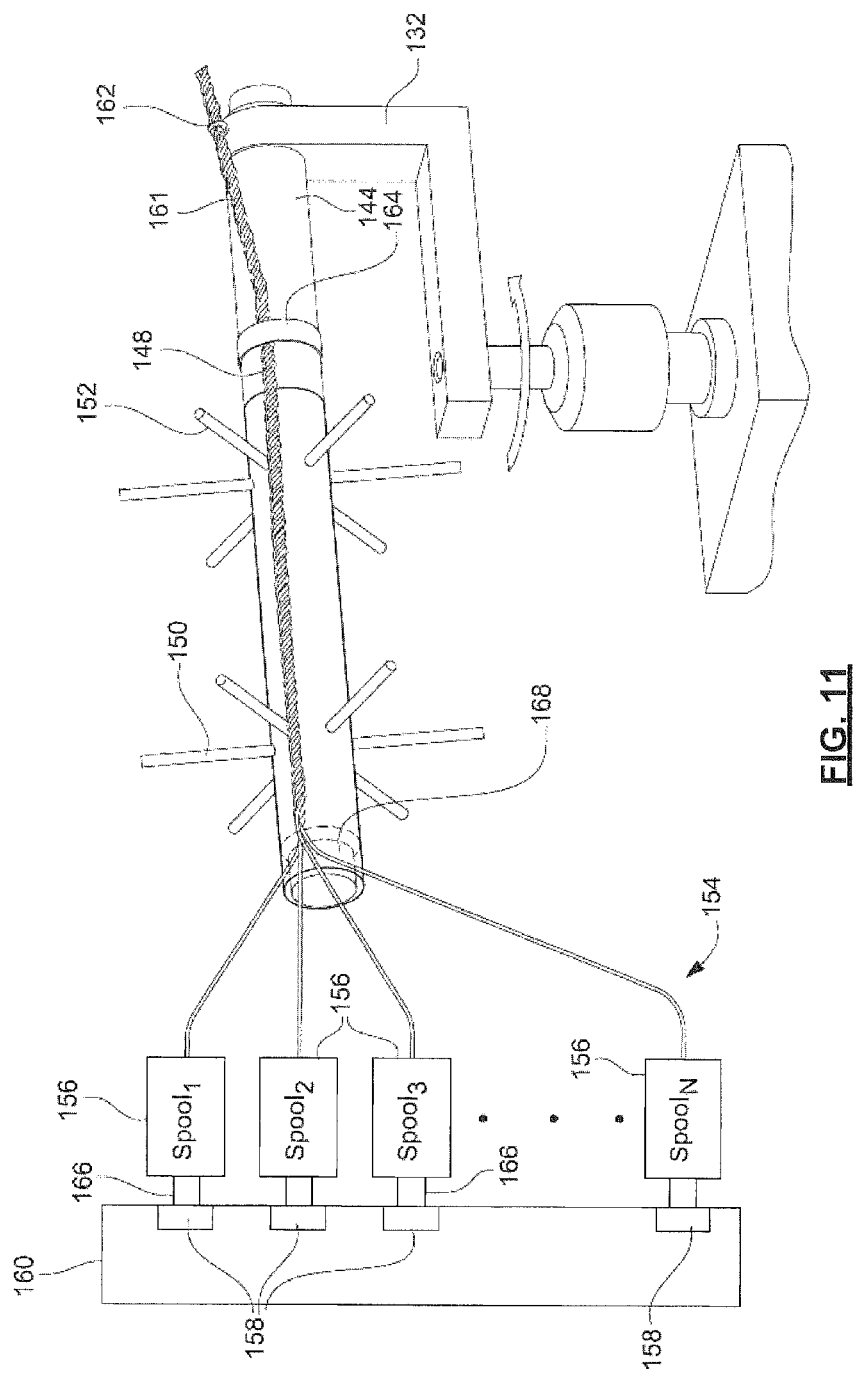
FIG. 11 is a block and side perspective view of a wire delivery system illustrating placement of wires relative to the mandrel and some of the pins in accordance with an embodiment of the present disclosure.

At 210, a first (or current) set of wires (e.g., wires 148) are grouped together and aligned with two pins 150, 152 (one pin from each of the sets of pins 118, 120) on the mandrel 108. An example of this is shown in FIG. 11. FIG. 11 shows a wire delivery system 154. The wire delivery system 154 is provided as an example and may be replaced with another wire delivery system. The wire delivery system 154 includes spools 156, spool tensioners 158, and a support bracket 160. A first end 161 of the wires may be knotted together to provide a knot 162 and held via, for example, tape 164 to the first end 144 of the mandrel 108. The first end 161 of the wires may be labeled "x in" with a tag to indicate that this is an input end (or end that receives power) in the current set of wires, where x identifies the number of the sets of wires to be included in the coil assembly. The wires may be wound respectively on the spools 156 and extend from the spools 156 to the mandrel 108, where the wires are then grouped together and knotted as shown.

The spools 156 may be mounted on the support bracket 160. Each of the spools 156 may have and/or be connected respectively to the spool tensioners 158 to provide uniform and/or predetermined levels of tension on the wires. In one embodiment, the spool tensioners 158 provide a same amount of tension on each of the wires. In another embodiment, the spool tensioners 158 provide different levels of tension on the wires. The spool tensioners 158 may be connected to the spools via respective shafts 166. In addition or as an alternative to the spool tensioners 158, post-spool tensioners 157 may be used to "squeeze" down on the wires as the wire comes off the spool. The post-spool tensioners 157 may be located between the spools and the mandrel 108. Friction provided by the squeezing of the wires provides tension as the wires are pulled off the spools 156. When the spool tensioners 158 are not used and the post-spool tensioners 157 are used, the spools 156 are loosely mounted on the support bracket 160 to freely rotate. Although not shown, the post-spool tensioners 157 may be mounted on and/or supported by the support bracket 160. The support bracket may be rigidly held in place relative to the rotating device 130.

The attaching of the wires on the first end 144 of the mandrel 108 and the tension on the wires at a second end 168 of the mandrel 108 allows the wires to be tightly and uniformly wrapped on the mandrel 108 without kinks and/or undesigned bends in the wires. The wires may be held in a parallel extending fashion or may be twisted together. In one embodiment, the tension on the wires is controlled via the control module 138 of FIG. 10 or other control module connected to the spool tensioners 158.

Figure 12:
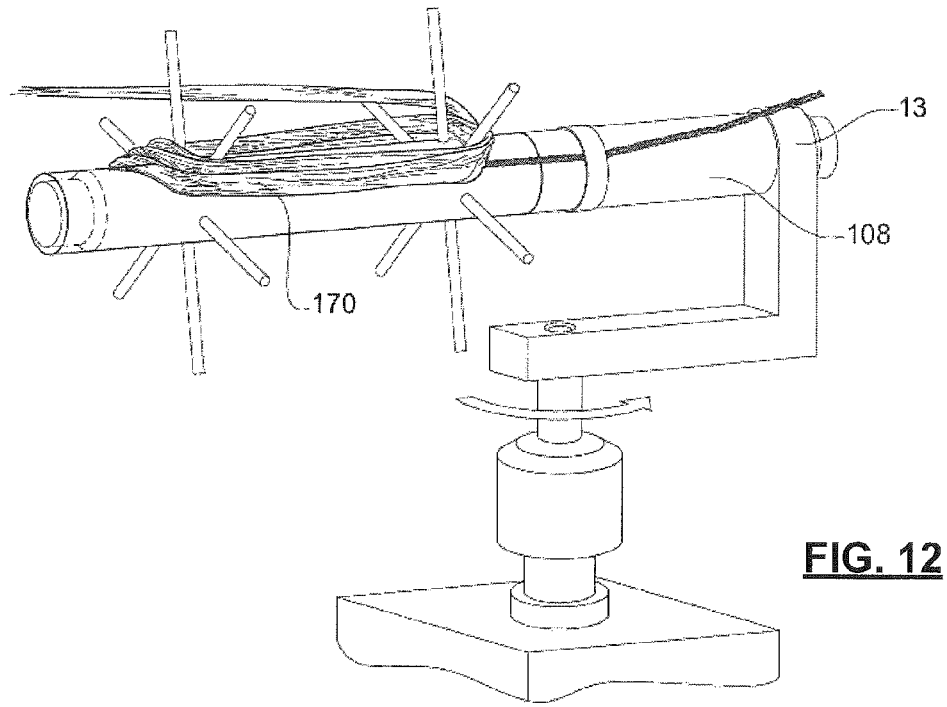
FIG. 12 is a perspective view illustrating wrapping wires of a first coil of a first phase set of the multi-phase set coil assembly in accordance with an embodiment of the present disclosure.

At 212, the first (or current) set of wires is wrapped around four (or first group) of the pins (two of the four pins are in the first set of pins 118 and the other two pins are in the second set of pins 120). The two pins in each set of pins are 120° apart from each other. The rotary chuck 136 is rotated to radially rotate the mandrel 108 and wrap the wires on the four pins and provide a first coil 170 of a first (or current) phase set of the coil assembly. The wires may be wrapped until the counter 140 reaches the predetermined number of times (or predetermined number of wraps). As an example, the predetermined number of times may be 18. FIG. 12 shows an example of the wires wrapped on the four pins.

At 214, the mandrel 108 is rotated axially 180° prior to wrapping a second coil 172 of the current phase set of the coil assembly. This may include rotating the mandrel 108 counter clockwise as seen from the mounting bracket 132 at the first end 144 of the mandrel 108. The wires are then aligned with a second group of pins.

Figure 13:
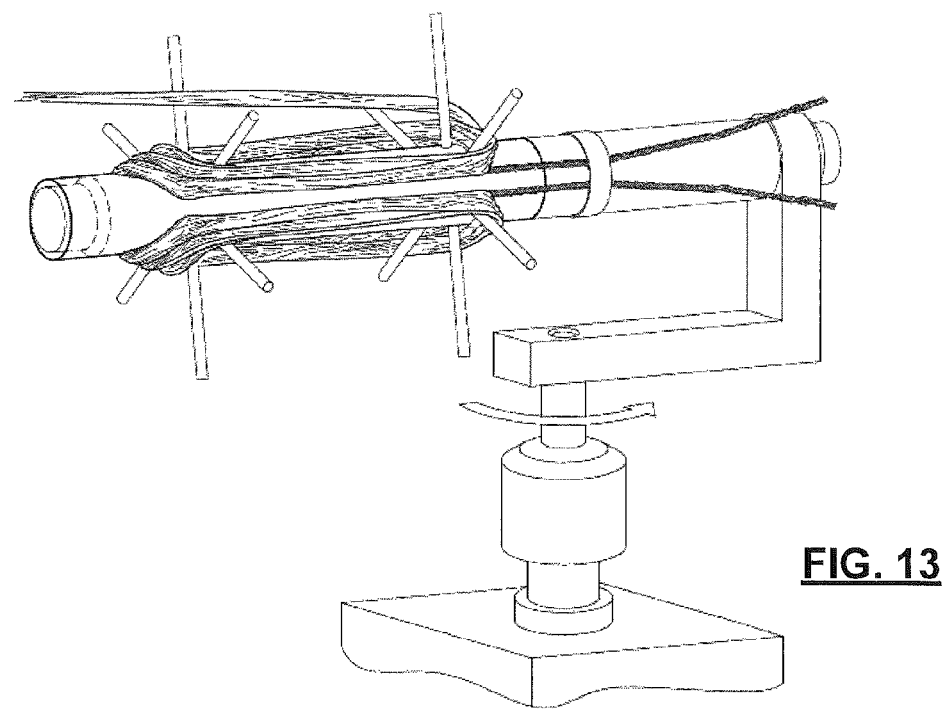
FIG. 13 is a perspective view illustrating wrapping wires of a second coil of the first phase set of the multi-phase set coil assembly of FIG. 12.

At 215, the mandrel 108 is radially rotated to wrap the second coil of the current phase set of the coil assembly. FIG. 13 shows the second coil 172 formed by wrapping the wires around a second group of pins.

At 216, the wires are cut near the second end 168 of the mandrel 108 to provide a cut (or second) end 176. The second end 176 of the wires may be knotted and labeled "x out" to indicate that the second end 176 is an output end of the current set of wires. FIG. 13 shows the wires cut at the second end.

At 218, if another phase set of the coil assembly is to be added to the mandrel 108, task 220 is performed, otherwise task 222 is performed. Tasks 210-216 may be performed 3 times for a 3-phase set coil assembly.

Figure 14:
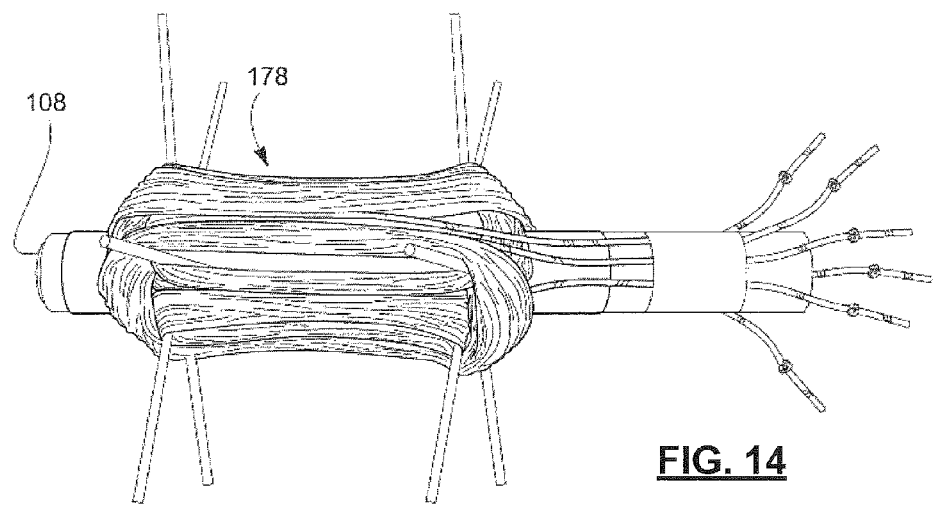
FIG. 14 is a side perspective view of the multi-phase set coil assembly mounted on the mandrel in accordance with an embodiment of the present disclosure.

At 220, the mandrel 108 is rotated axially 120° to begin wrapping of a next phase set of the coil assembly and the counter 140 may be reset. This may be a counter clock wise rotation as seen at the mounting bracket 132 and/or first end 144 of the mandrel 108. Task 220 may be performed twice for a 3-phase set coil assembly. At the completion of tasks 202-220, multiple (e.g., 3) phase sets of coils may have been formed. Each of the phase sets may be 120° out-of-phase from each other. Each coil of a phase set may be 60° out-of-phase from adjacent coils and 180° out-of-phase from the other coil of the same phase set. FIG. 14 shows a 3-phase set coil assembly 178 mounted on the mandrel 108 after completion of tasks 202-220.

Figure 15:
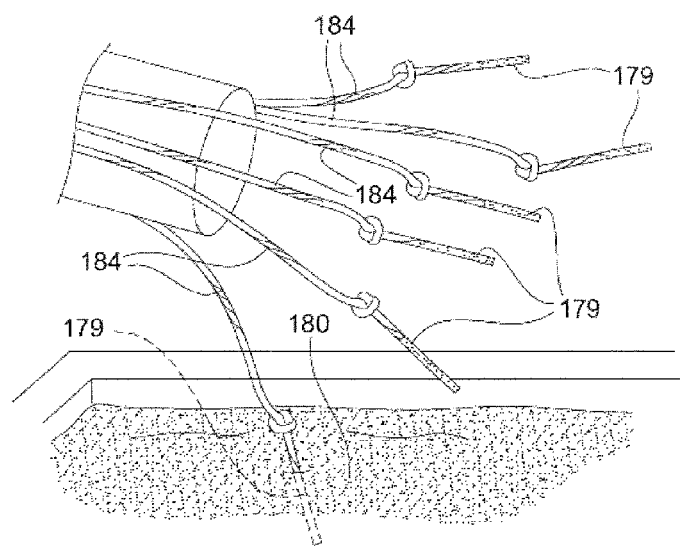
FIG. 15 is a perspective environmental view illustrating heat stripping and coating of ends of sets of wires of the multi-phase set coil assembly in accordance with an embodiment of the present disclosure.

At 222, the ends of the sets of wires are (i) stripped (by heat, chemicals or mechanical devices depending on the type of insulation used on the wire) to remove insulation layers from the ends of the wires, and (ii) coated. The ends of the set of wires may be heated to a predetermined temperature (e.g., 400° C.) to remove the insulation layers at the ends of the sets of wires. The insulation layers are not removed from the remainder of the sets of wires. The coating of the ends may include tinning the ends. In one embodiment, the ends of the sets of wires are dipped in a solder bath to coat and bind together the conductive filaments exposed due to the heat stripping. In one embodiment, the heat stripping and the coating are performed at the same time. A temperature of the coating material may be high enough (greater than or equal to a predetermined temperature) to remove the insulation layers and at the same time coat the ends of the sets of wires. FIG. 15 shows a solder bath 180 and coated ends 179 of sets of wires 184. In an alternative embodiment, the stripping and coating of the sets of wires 184 change a bit such that no knots in the wires are created. In one embodiment, the ends 179 of each of the sets of the wires 184 are held together via terminations (or connectors). The terminations may be connected to a printed circuit board (PCB). As another alternative, the sets of wires 184 may terminate at the PCB.

At 224, a set of the pins (e.g., the second set of pins 118) (this conflicts with numbering in FIG. 9 where 120 is towards long side of mandrel) is removed from the second end 168 of the mandrel 108 and a first portion 181 of the coils are wrapped and compressed. FIG. 16 shows the second set of pins 118 removed. The other set of pins (i.e. the first set of pins 120) remains in the mandrel 108. The first portion 181 of the coils may extend from a center 182 of the coils along the mandrel 108 to a distal end 183 of the coils. The first portion 181 may be wrapped, for example with a first portion 184 of a first protection layer and then compressed via a cable tie 185 (or tie wrap). The first portion 181 of the first protection layer may include paper. The cable tie 185 may be placed over the paper and around the first portion 181 of the coils and pulled tight to hold in place and compress the first portion 181 of the coils. FIG. 17 shows the first portion 181 wrapped and compressed.

At 226, the other set of the pins (e.g., the first set of pins 120) is removed from the first end 144 of the mandrel 108 and a second portion 186 of the coils are wrapped and compressed. FIG. 18 shows the first set of pins 120 removed. The second portion 186 of the coils may extend from the center 182 of the coils along the mandrel 108 to a proximal end 187 of the coils. The second portion 186 may be wrapped, for example with a second portion 188 of the first protection layer and then compressed via a second cable tie 189. The second portion 188 of the first protection layer may include paper. The second cable tie 189 may be placed over the paper and around the second portion 186 of the coils and pulled tight to hold in place and compress the second portion 186 of the coils. FIG. 19 shows the second portion wrapped and compressed.

At 228, resistances are measured. The resistances (e.g., R1, R2, and R3 for a 3-set coil assembly) of each of the phase sets may be measured. A total resistance Rtot of the phases connected in series may be measured. Resistances between the phase sets may be measured. Resistances (e.g., R1m, R2m, R3m, where 1, 2, and 3 are phase set numbers and m refers to the mandrel) between each of the phase sets and the mandrel 108 may also be measured. The stated resistances may be measured for reference purposes and later verified to check whether the phase sets have been damaged during tasks 230-246 and/or to monitor changes in the resistances due to performing tasks 230-246.

Figure 20:
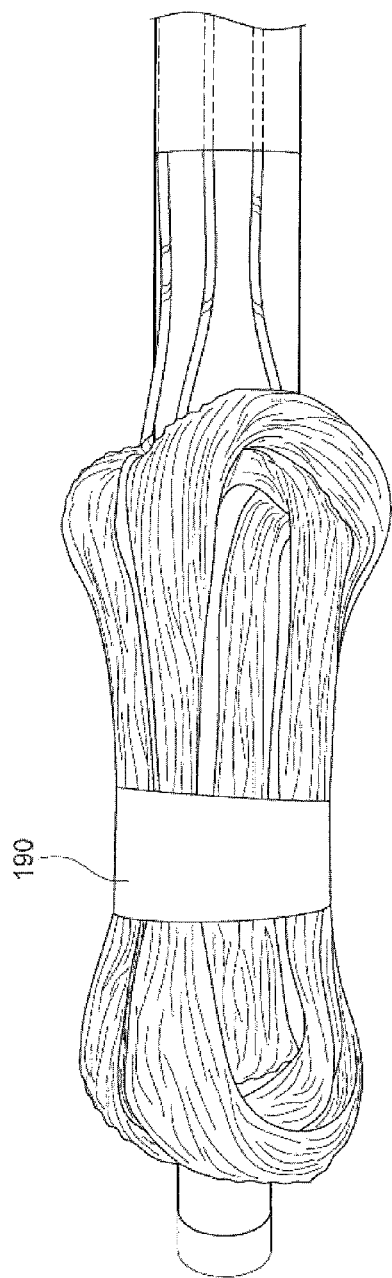
FIG. 20 is a perspective view of the multi-phase set coil assembly mounted on the mandrel illustrating a thermocouple and a holding layer over a center of the multi-phase set coil assembly in accordance with an embodiment of the present disclosure.

At 230, the first protective layer and the cable ties 185, 189 are removed from the coils. At 231, a holding layer 190 is applied to a center portion and over an exterior (or outer surface) of the coils to hold the coils in place. The holding layer 190 may include a polyimide film. This is shown in FIG. 20.

At 232, a thermocouple 192 and a second protection layer 193 is applied to the coils (or coil body 194). The thermocouple 192 is applied to monitor a temperature of the coils during compression and/or fusing of the coils, as performed in the following tasks. The second protection layer 193 may include a polyimide film and prevent scraping of the wires of the coils. As an example, the temperature may be monitored by the control module 138 of FIG. 10 or by another control module. In the following tasks, if the temperature, as indicated by the thermocouple 192, exceeds a predetermined temperature, compression and/or fusing may be stopped and/or current applied to the coils may be decreased. Power and/or current supplied to the coils may be provided via a power source 233 (shown in FIG. 10), which may be controlled via the control module 138 or other control module. The power source 233 may be directly connected to the coils or may be connected to the coils via the control module.

The thermocouple 192 may be applied to any part of the coils and/or connected to the control module 138 (or other control module). The thermocouple 192 may be applied to the proximal end of the coil body 194 to not interfere with compression of the coil body 194 during the following tasks. The thermocouple 192 may be applied during task 231 or during another task. More than one thermocouple may be applied and monitored.

Figure 21:
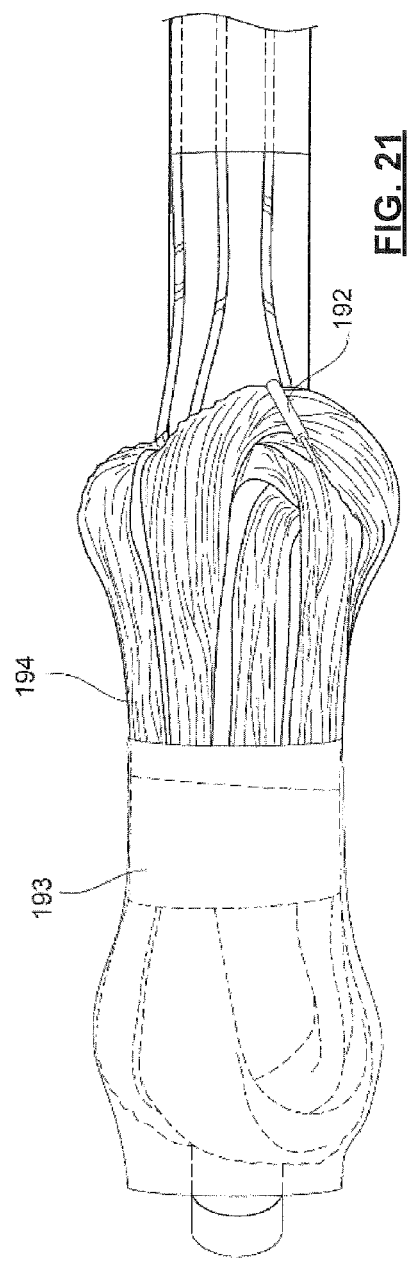
FIG. 21 is a perspective view of the multi-phase set coil assembly mounted on the mandrel illustrating a protection layer being applied over a center portion of the multi-phase set coil assembly in accordance with an embodiment of the present disclosure.
Figure 22:
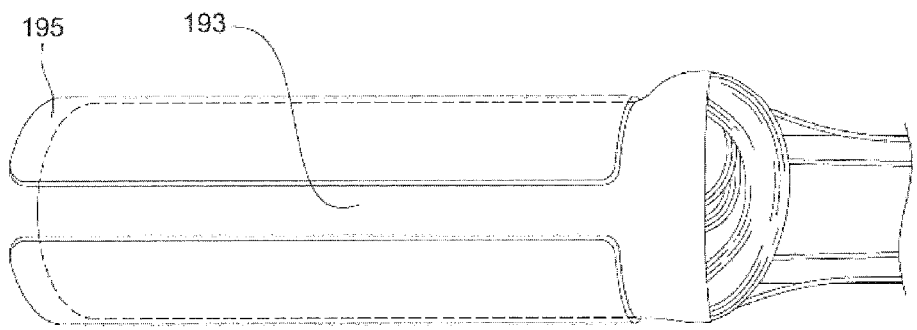
FIG. 22 is a perspective view of the multi-phase set coil assembly mounted on the mandrel illustrating a portion of the multi-phase set coil assembly inserted in a sleeve in accordance with an embodiment of the present disclosure.

FIG. 21 shows the second protection layer 193 applied on the distal and/or center portions of the coils. FIG. 22 shows the second protective layer 193 applied to (i) distal and center portions of the coils, and (ii) a portion of the proximal portion of the coils. Although not shown, the second protection layer may cover all of the proximal portion of the coils. The second protective layer 193 is applied over an exterior (or outer surface) of the coils.

At 234, the distal and center portions of the coils and the first end 144 of the mandrel 108 are slid into a sleeve. The sleeve may be 'C'-shaped and formed of, for example, stainless steel. The sleeve may be positioned on the coils based on final predetermined dimensions of the coils. As an example, the sleeve may be slid up to the proximal end (or proximal portion) of the coil and not slide over the proximal end of the coils. This is because the proximal end of the coils may not be compressed or may be minimally compressed during the following tasks. Thus, the proximal end of the coils may have a larger outer diameter than outer diameters of the distal and center portions of the coils. This may be based on interior dimensions in a motor housing in which the coils are to be placed. Applying of the sleeve may at least partially compress the distal and center portions of the coils. FIG. 22 shows an example of a 'C'-shaped sleeve 195 on distal and center portions of coils.

At 236, the phase sets are connected in series and a predetermined amount of current is applied to the phase sets to pre-fuse the wires together. As an example, 20 amperes (A) of DC current may be applied to the phase sets to heat and fuse the wires.

Figure 23:
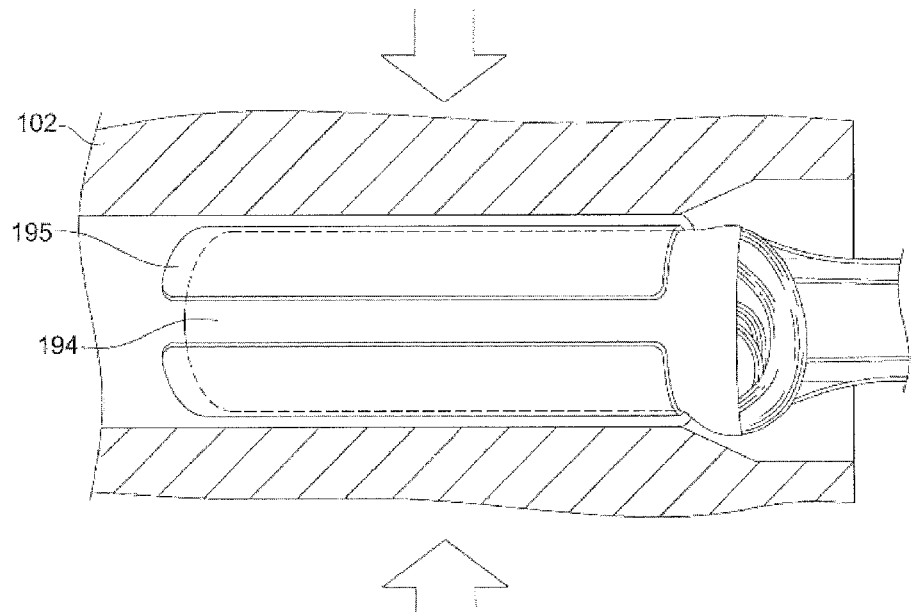
FIG. 23 is a perspective view of the multi-phase set coil assembly, the mandrel, and the sleeve inserted in a base of a press in accordance with an embodiment of the present disclosure.

At 238, the coils, the sleeve, and the mandrel 108 are placed in and/or pushed in the base 102 of the press 100. The sleeve may be placed in the base 102, such that an opening (or mouth) 239 of the sleeve faces upward and/or out of the base 102 and can be seen from a top of the base 102. This is shown in FIG. 23. Some of the inner dimensions of the base 102 match or are similar to outer dimensions of the coils and sleeve. The base 102 may be clam-shaped or 'C'-shaped, as shown, and has an opening through which the coils, sleeve, and mandrel 108 are provided. Due to task 236, a temperature of the coils, sleeve and/or mandrel 108 may be greater than a predetermined temperature when placed in the base 102.

Figure 24:
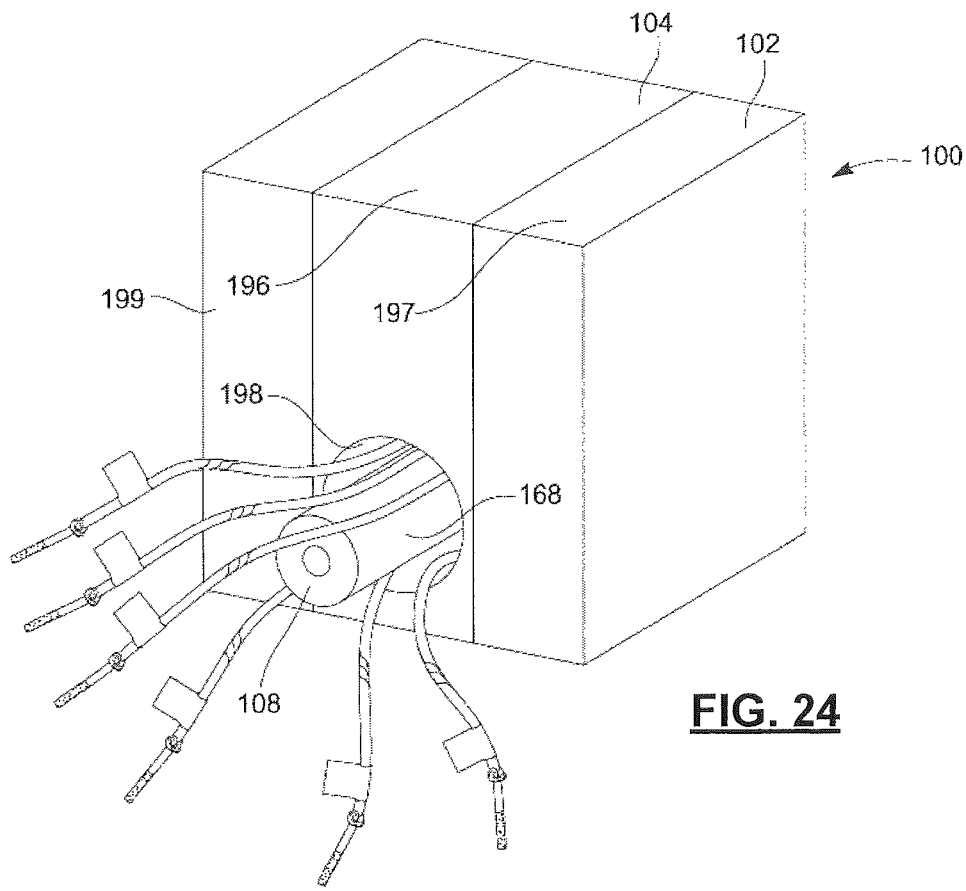
FIG. 24 is a perspective view of the press in a closed fully compressed state in accordance with an embodiment of the present disclosure.

At 240, the compression block 104 of the press is placed in the opening of the base 102 and over the coils, sleeve, and mandrel 108. Some of the inner dimensions of the compression block 104 may match or be similar to exterior dimensions of the coil body. Pressure is applied on the compression block 104 and thus to the sleeve to compress the coils. The compression block 104 may be pushed down into the base 102 until a top surface 196 of the compression block 104 is (i) above a top surface 197 of the base 102 by a first predetermined amount, (ii) flush with the top surface 197 of the base 102, or (iii) below a top surface 197 of the base 102 by a second predetermined amount. Pressure on the compression block 104 may be increased to a predetermined amount to provide a predetermined amount of compression. FIG. 24 shows the press 100 with the compression block 104 over the coils, sleeve, and mandrel 108 and in the base 102. The second end 168 of the mandrel 108 and the ends of the sets of wires extend out of an opening 198 on one side 199 of the press.

At 241, the coils are fused a second time. Current is applied to the phase sets. The phase sets may be connected in series as in task 236 and/or may still be connected in series from task 236. A DC current is applied to the phase sets to heat the wires to a predetermined temperature. This may be controlled via the control module 138 and/or another control module. The power may be provided via the power source 233. The predetermined temperature may be, for example, 200° C.±10° C. The DC current may be slowly ramped up to a predetermined level of current at a predetermined rate to provide even heating of the wires. The predetermined level of current and the predetermined temperature may be maintained for a predetermined period of time.

At 242, the compression block 104 is further pushed down into the base 102. The pressure applied to the compression block 104 may be the same as or greater than the amount of pressure applied at 240. The compression block 104 may be pushed down into the base 102 until the top surface 196 of the compression block 104 is flush with the top surface 197 of the base 102 or below a top surface 197 of the base 102 by a third predetermined amount. The third predetermined amount may be the same as or different than the second predetermined amount.

At 243, if the coils, sleeve and mandrel 108 are to be rotated, task 244 may be performed, otherwise task 245 may be performed. At 244, the compression block 104 may be removed from the base 102 and the coils, sleeve and/or mandrel 108 may be axially rotated in the base 102. Task 234 may be performed subsequent to task 244.

Tasks 234-244 may be repeated a predetermined number of times, such that the coils, sleeve and/or mandrel 108 are rotated and compressed the predetermined number of times to provide an even amount of compression on the coils such that the coil body has a round exterior dimension. Each rotation of the coils may include axially rotating the sleeve on the coils.

At 245, the compression block 104 is removed from the base 102 and the coils, sleeve and mandrel 108 are removed from the press 100. At 246, the sleeve is removed from the coils and the coils are removed from the mandrel 108. This may include removing the one or more thermocouples and the second protective layer 193 from the coil body 194. The coils may be twisted to unstick the coils from the mandrel.

At 248, the resistances measured at 228 may be remeasured and compared with the resistances measured at 228. If the resistances measured the second time are out of predetermined ranges from the corresponding resistances measure the first time, then one or more of the wires and/or coils may be damaged. The resistances may be measured prior to removal of the coils from the mandrel 108 in order to obtain the resistances between the phase sets and the mandrel 108 (e.g., the resistances R1$m$, R2$m$ and R3$m$). At 248, dimensions of the coil body 194 may be measured and compared with predetermined dimensions to assure that the coil body 194 is within predetermined ranges of the predetermined dimensions. This may include measuring lengths, outer diameters, and inner diameters of the coil body 194. The method may end at 250.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A motor for a surgical instrument, the motor comprising:
   a rotor comprising a shaft and a magnet; and
   a stator comprising (i) a cavity in which the rotor is disposed, and (ii) a coil assembly, wherein
   the coil assembly comprises a plurality of phase sets,
   the plurality of phase sets comprise a plurality of sets of wires, wherein each set of the plurality of sets of wires comprises multiple wires,
   each of the plurality of phase sets comprises a plurality of coils and corresponds to a respective one of the plurality of sets of wires,
   the coils in each of the plurality of phase sets are at respective positions about the rotor,
   one of the plurality of sets of wires comprises at least three wires, and
   the stator causes the rotor to axially rotate a surgical tool of the surgical instrument based on current received at the plurality of sets of wires.

2. The motor of claim 1, wherein each of the plurality of sets of wires comprises three or more wires.

3. The motor of claim 1, wherein each of the plurality of sets of wires comprises 15-20 wires.

4. The motor of claim 1, wherein:
   the coil assembly comprises three phase sets of coils;
   each of the phase sets of coils comprises two coils;

the phase sets are 120° out-of-phase from each other relative to the rotor;

each of the coils in the plurality of phase sets are evenly distributed about the rotor at 60° intervals; and the coils of each of the plurality of phase sets are 180° apart from each other such that the coils in each of the plurality of phase sets are opposite each other.

5. The motor of claim 1, wherein the coils are evenly distributed about the rotor at 60° intervals.

6. The motor of claim 1, wherein the plurality of sets of wires are a compressed plurality of sets of wires having a rigid structure such that the coil assembly is not supported by a support member extending within the coil assembly.

7. The motor of claim 1, wherein a cross-sectional diameter of each of the wires in the plurality of sets of wires is between 0.10-0.12 mm.

8. The motor of claim 1, wherein:
each of the wires in the plurality of sets of wires has a round shaped cross-section; and
a fill factor of the coil assembly is greater than or equal to 58%.

9. The motor of claim 1, wherein:
each of the wires in the plurality of sets of wires comprises a bonding layer and has a round shaped cross-section; and
a fill factor of the coil assembly is between 58-65%.

10. The motor of claim 9, wherein the bonding layers comprise a bonding agent or varnish.

11. The motor of claim 9, wherein each of the wires in the plurality of sets of wires comprises an insulation layer.

12. The motor of claim 11, wherein a combined thickness of the insulation layer and the bonding layer of each of the wires in the plurality of sets of wires is 15 μm.

13. The motor of claim 1, wherein:
each of the wires in the plurality of sets of wires does not include a bonding layer and has a round shaped cross-section; and
a fill factor of the coil assembly is between 66-74%.

14. A surgical instrument comprising:
the motor of claim 1;
a motor housing comprising the motor;
a collet connected to the motor housing and through with a portion of the surgical tool extends; and
a cable connected to the motor and supplying the current to the plurality of sets of wires.

15. The motor of claim 1, wherein the plurality of phase sets comprise:
a first phase set for a first phase of the motor;
a second phase set for a second phase of the motor; and
a third phase set for a third phase of the motor.

16. The motor of claim 1, wherein each of the wires in the plurality of sets of wires comprises a bonding layer.

17. The motor of claim 16, wherein each of the wires in the plurality of sets of wires comprises an insulation layer.

18. The motor of claim 1, wherein an outer diameter of a center portion or a distal end of the coil assembly is 10-11 mm.

19. The motor of claim 18, wherein an outer diameter of a proximal end of the coil assembly is 12-14 mm.

20. A motor housing comprising:
the motor of claim 1;
one or more walls; and
one or more laminations disposed on one or more interior surfaces of the one or more walls,
wherein
the coil assembly is held in place via the one or more laminations, and
the stator does not include a support member for supporting the coil assembly.

21. The motor housing of claim 20, wherein:
a gap exists between the coil assembly and the one or more laminations; and
the gap is filled with a dielectric material.

22. The motor of claim 1, wherein each set of the plurality of sets of wires includes a plurality of simultaneously wound wires.

23. The motor of claim 1, wherein:
each of the plurality of coils has a first end and a second end; and
each of the wires in the plurality of sets of wires has (i) a first end at a corresponding one of the first ends of the plurality of coils, and (ii) a second end at a corresponding one of the second ends of the plurality of coils.

* * * * *

UNITED STATES PATENT AND TRADEMARK OFFICE
CERTIFICATE OF CORRECTION

PATENT NO. : 9,979,247 B2  
APPLICATION NO. : 14/534794  
DATED : May 22, 2018  
INVENTOR(S) : Luedi et al.

Page 1 of 1

It is certified that error appears in the above-identified patent and that said Letters Patent is hereby corrected as shown below:

In the Claims

Column 14, Line 46, Claim 1: after "wherein", insert --:--

Column 16, Line 23, Claim 20: after "wherein", insert --:--

Signed and Sealed this  
Sixteenth Day of October, 2018

Andrei Iancu  
*Director of the United States Patent and Trademark Office*